June 2, 1953 G. A. WAHLMARK 2,640,736
FLUID SEAL
Filed Jan. 28, 1950
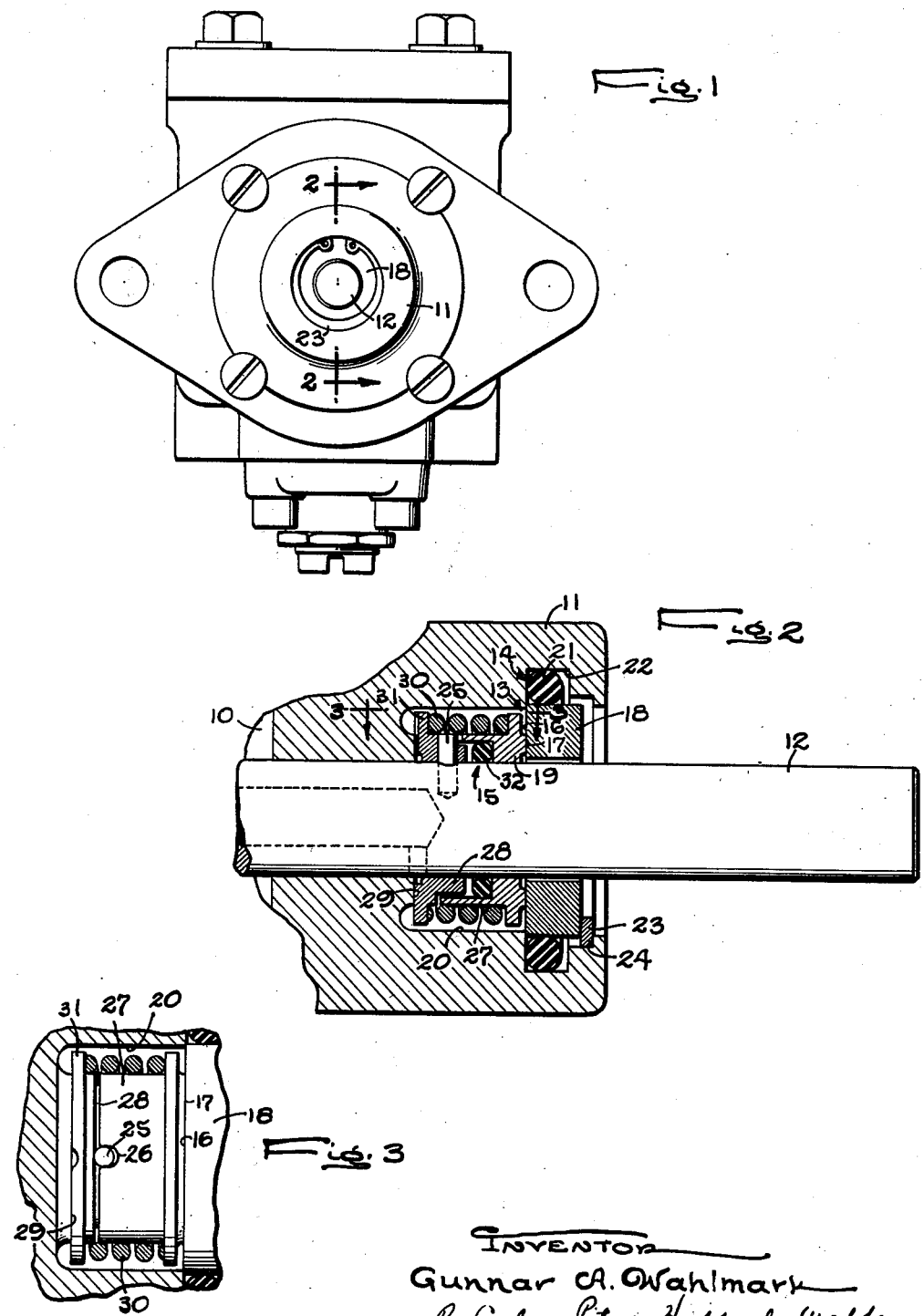
INVENTOR
Gunnar A. Wahlmark
By Carlson, Pitzner, Hubbard & Wolfe
ATTORNEYS Patented June 2, 1953

2,640,736

UNITED STATES PATENT OFFICE 2,640,736

FLUID SEAL

Gunnar A. Wahlmark, Rockford, Ill.

Application January 28, 1950, Serial No. 141,079

1 Claim. (Cl. 308—36.2)

This invention relates to fluid seals and the primary object is to provide a seal for preventing the flow of fluid along a shaft between the latter and the bearing therefor while minimizing the resistance to rotation of the shaft relative to the bearing.

A more detailed object is to provide a seal of the above character in which the relatively rotating surfaces are flat axially facing ends of two rigid rings surrounding the shaft and engaging each other axially.

The invention also resides in the novel manner of sealing around the exterior of one of the rigid rings and around the interior of the other ring and in the manner of holding one of the rigid rings against rotation relative to the shaft while permitting floating of the ring axially of the shaft.

Other objects and advantages of the invention will become apparent from the following detailed description taken in connection with the accompanying drawings, in which Figure 1 is an elevational view of a mounting for the seal.

Fig. 2 is an enlarged sectional view taken along the line 2—2 of Fig. 1.

Fig. 3 is a fragmentary plan view as indicated by the line 3—3 of Fig. 2.

In the drawings, the invention is shown for purposes of illustration incorporated in a seal for preventing the flow of fluid from a chamber 10 out along a sleeve 11 whose internal cylindrical surface provides a bearing for a shaft 12 projecting from the outer end of the sleeve. In general, the improved seal comprises three separate seals 13, 14, and 15 the primary one 13 of which is formed by rigid surfaces 16 and 17 on two rigid sealing elements 18 and 19 which rotate relative to each other and are pressed together yieldably. The other or secondary seals 14 and 15 are formed between one of the principal elements and the shaft and between the other principal element and the sleeve. In the case of each secondary seal, the seal is effected by a yieldable material such as rubber and the members between which the seal is formed are held against rotation relative to each other.

The primary sealing surfaces 16 and 17 or the ones rotating relative to each other and constituting the principal seal 13 are arranged to minimize the resistance to rotation of the shaft. In the present instance, one surface 16 is the axially facing flat inner end of an outer rigid ring which is composed of a well known bearing material and is mounted in a recess 20 in the outer end portion of the bearing sleeve. The other surface 17 is the axially facing flat outer end of an inner rigid ring which is mounted on the shaft 12 and constitutes the other primary element 19.

Preferably, the ring 18 is a thick rigid washer composed of a compressed graphite material sold to the trade under the name "Graphitor" which has been treated specially to avoid the transfer of oil through its pores. This is accomplished by dipping the machined washer in a liquid lacquer such as Glyptal resin and after such impregnation and baking to set the resin, lapping the end surfaces of the washer to the desired flatness.

The outer ring 18 is in the form of a flat washer which loosely surrounds the shaft 12 and is mounted in the bearing sleeve 11 so as to be held against rotation with the shaft. In the present instance, the mounting for this ring includes a yielding O-ring 21 which is seated in an annular groove 22 formed around the interior of the sleeve recess 20 and into which the washer is pressed, the O-ring engaging the outer periphery of the washer to form the secondary seal 14 between the latter and the sleeve. Thus, escape of fluid through the sleeve and around the outer periphery of the washer is effectually prevented because the O-ring can be compressed considerably and, owing to the high friction coefficient of rubber and the large diameter of the O-ring, the latter holds the outer ring frictionally against rotation with the sleeve. A snap ring 23 which engages a shoulder 24 at the outer end of the sleeve recess 20 holds all of the parts in assembled position while permitting disassembly thereof when desired.

The inner rigid ring 19 providing the other axially facing sealing surface 17 is slidable along the shaft 12 but, herein, is held against rotation relative thereto by a sliding key connection comprising a pin 25 (see Figs. 2 and 3) which projects radially and outwardly from the shaft and is received in a slot 26 extending along the shaft and formed in the end of a cylindrical flange 27 on the inner side of the inner rigid ring. Intermediate its ends, the pin 25 extends through a metal collar 28 which is held fast on the shaft by the pin and at its inner end engages an axially facing shoulder 29 on the bearing sleeve 11 and at the inner end of the recess 20 to position the shaft axially with respect to the sleeve.

The axially facing surfaces 16 and 17 are yieldably urged into engagement with each other in this instance by a coiled spring 30 which surrounds the cylindrical flange 27 on the inner rigid ring 19 and bears at one end against a radially extending flange 31 projecting outwardly from the metal collar 28. At its other end, the spring bears against the inner rigid ring to urge the latter toward the outer end of the shaft and into engagement with the washer 18.

In this instance, the inner rigid ring 19 is sealed with respect to the shaft by a second or inner O-ring 32 of yieldable material which is compressed tightly between the cylindrical flange 27 and the shaft and effectually prevents the flow of fluid along the latter around the inner periphery of the rigid ring. The only relatively rotating parts of the three seals 13, 14, and 15 are the axially engageable sealing surfaces 16 and 17 with no rotation of either O-ring relative to the parts engaging the same. Thus, it is possible to form the yieldable seals 14 and 15 by using standard O-rings thereby simplifying the construction and reducing the cost of these seals.

To assemble the fluid seal above described, the collar 28 is fixed by the pin 25 to the shaft 12 and the latter is inserted in the bearing sleeve and moved inwardly until the collar engages the shoulder 29. Next, the inner O-ring 32 is pressed onto the shaft and the coiled spring 30 moved axially into engagement with the collar followed by fitting the inner rigid ring 19 on the shaft until the pin 25 is received in the slot 26. As the inner ring is moved inwardly along the shaft, the cylindrical flange 27 compresses the inner O-ring against the shaft. Next, with the outer O-ring inserted in the annular groove 22, the washer 18 is pressed into the O-ring to bring the outer flat sealing surface 16 into engagement with the inner sealing surface 17 on the inner rigid ring, the outer O-ring being compressed between the bearing sleeve and the outer periphery of the washer. Finally, with the washer moved inwardly beyond the shoulder 24 for the snap ring 23, the latter is inserted to hold the washer against outward movement under the action of the spring.

It will be apparent from the foregoing that an effective fluid seal between the bearing sleeve 11 and the shaft 12 is formed by the three separate seals 13, 14, and 15, one between the inner rigid ring 19 and the shaft, another, between the washer 18 and the sleeve, and the primary seal between the inner rigid ring and the washer. Since relative rotation between the engaging surfaces of the two secondary seals 14 and 15 is prevented positively, a yieldable material may be used to produce the sealing pressure at these points. The effect of these seals or the amount of pressure applied between the engaging surfaces thereof does not effect the rotation of the shaft in the bearing sleeve because the surfaces do not turn relative to each other and there is no rubbing friction between them. Since the relatively rotating surfaces 16 and 17 of the primary seal engage each other axially, the rings 18 and 19 can be rigid so that a close fit and the application of a substantial pressure may be relied upon to produce an effectual sealing action with little friction between the surfaces. In addition, the construction above described lends itself readily to replacement of worn parts without the necessity of removing the shaft from the bearing sleeve.

I claim as my invention:

The combination of, a bearing sleeve, a shaft journaled in said sleeve, two axially spaced, inner and outer abutments on said sleeve disposed within the latter perpendicular to the axis thereof and facing toward each other, the outer abutment being sealed in said sleeve, a member rigid with and projecting outwardly from said shaft and bearing against the other of said abutments, a ring encircling said shaft between said first abutment and said member, means positively coupling said ring and said shaft for rotation together while permitting axial sliding of the ring relative to the shaft, a spring acting in compression between said member and said ring to urge the two apart and thereby maintain said ring and said member in engagement with said abutments at all times, and means providing a fluid tight seal around said shaft and within said ring.

GUNNAR A. WAHLMARK.

References Cited in the file of this patent

UNITED STATES PATENTS

| Number | Name | Date |
|---|---|---|
| 2,405,464 | Storer, Jr. | Aug. 6, 1946 |
| 2,455,700 | Porges | Dec. 7, 1948 |
| 2,467,960 | Brady, Jr. | Apr. 19, 1949 |
| 2,489,212 | Zwack | Nov. 22, 1949 |